Oct. 8, 1929.  E. L. FARLEY  1,731,161
FISH LURE
Filed March 6, 1928
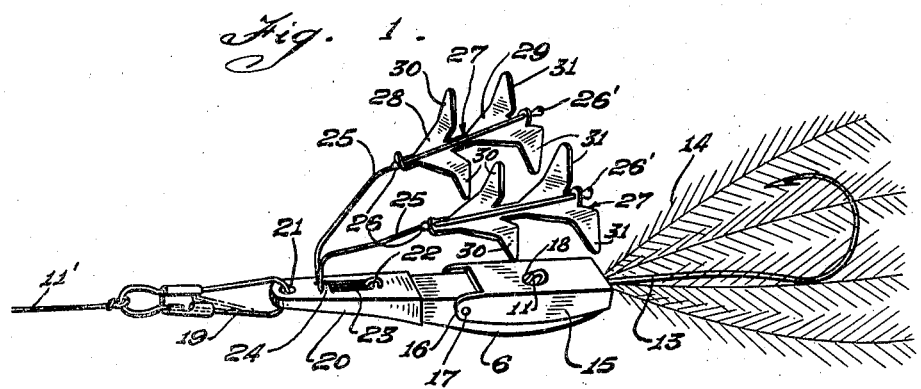
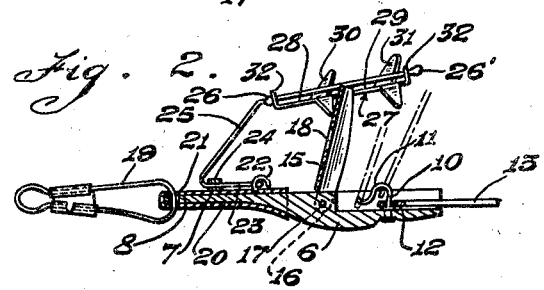
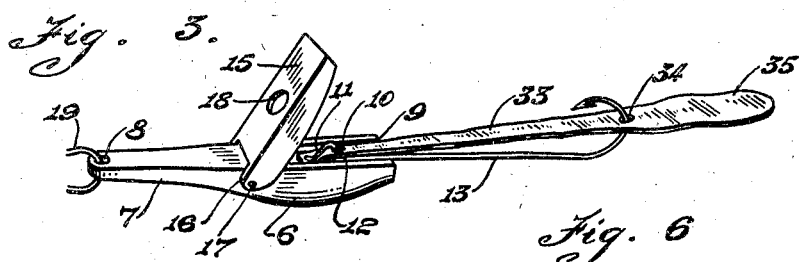
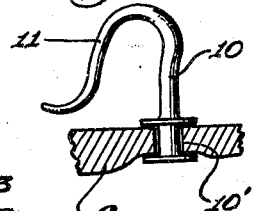
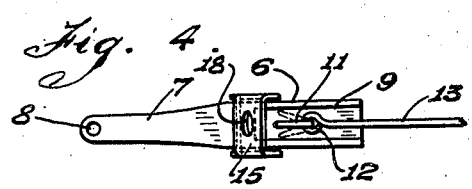
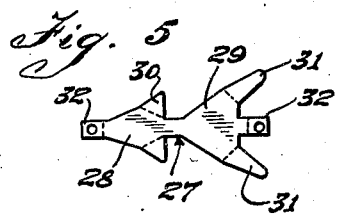
Inventor
Edward L. Farley
By
Attorney Patented Oct. 8, 1929

1,731,161

UNITED STATES PATENT OFFICE

EDWARD L. FARLEY, OF JONESBORO, ARKANSAS

FISH LURE

Application filed March 6, 1928. Serial No. 259,533.

This invention relates to improvements in fish lures, one object of the invention being the provision of a device of this character which can be used as a trolling or casting device and which is so constructed that the hook is properly housed and connected so as not to become accidentally disengaged but which can be readily disengaged for a change of lure or for the renewal of the hook.

A further object of this invention is the provision of a device of this character in which a spinner attachment may be readily attached or detached at will to the main carrying member and held in place thereon by the fishing line or the connection between the line and the lure.

A still further object of this invention is the provision of a device of this character in which the main carrying member is so constructed that the lure and hook may be readily attached or released with the least possible effort and which is simple and inexpensive to manufacture and thoroughly efficient and practical in use.

In the accompanying drawings:—

Figure 1 is a perspective view of the complete lure with the spinner attachment in position thereon;

Figure 2 is a longitudinal sectional view through the same with the hook broken off;

Figure 3 is a perspective view of the device used in connection with the bacon rind lure;

Figure 4 is a plan view of the hook-carrying member with the guard and lid elevated and a portion only of the hook shown;

Figure 5 is a plan view of the spinner blank used with the present lure; and

Figure 6 is an enlarged detail view showing the method of swivelly mounting the securing hook to the main carrying body.

Referring to the drawings, the numeral 6 designates the main body of the lure which is made preferably of metal either as a die casting or stamping having its forward end reduced in width and provided with a line- or fastener-receiving aperture 8 and having in its upper face a cavity or receptacle 9, which cavity extends from its rear end to a point approximately midway of its length. Extending upwardly from the bottom of this cavity or receptacle and secured within the body 6 is a shank 10 of the S-shaped hook 11, the curve of which projects beyond the upper face of the body 6 and the free end of which is below said face and spaced from the bottom of the receptacle or cavity and is projected toward the forward end of the member 6 so that the eye or opening 12 of a fish hook 13 will, in its normal position, fit upon the hook 11 and have no tendency to be released therefrom when being drawn through the water or when a fish is made captive thereby. By this means, the fish hook 13 may be readily attached and detached, as illustrated in the full and broken lines in Figure 2.

As shown in Figure 1, a fly 14 is bodily attached to and carried by the fish hook 13 so that the lure or fly is attached to or removed from the hook 11 with the fish hook 13.

A guard is carried by the plate 6 for holding the eye 12 of the fish hook 13 in place on the hook 11. This guard is shown as a plate 15 having its side edges bent substantially at right angles to its body portion to straddle and frictionally engage the opposite side edges of the plate 6. The forward ends of these bent side edges extend forwardly of the forward end of the body portion of the plate to form ears 16. A pin 17 extending through aligned openings in the ears 16 and a transverse opening in the plate 6 forwardly of the cavity 9 serves to hingedly connect the plate or guard 15 to the plate 6.

An opening 18 is formed in the plate 15 to receive the curve of the hook 11 when the plate or guard 15 is closed down upon the plate 6 over the cavity or receptacle 9. Therefore, when the device is drawn through the water by a line attached to the rear end of the plate 6 the guard or plate 15 will be held in closed position, not only by the frictional engagement of its angularly bent side edges with the opposite side edges of the plate 6 but by the movement of the water over the outer face of the plate 15.

When it is desired to attach a fish hook to the members 6 the plate 15 is raised to the position shown in Figures 2 and 3, and the hook with its fly or bait is attached to the hook 11 by placing the eye 12 of the fish hook in the respective broken and full line positions of Figure 2, the plate 15 being then closed, as illustrated in Figure 1.

In Figure 3, a bacon rind member or strip 33 is shown as having one end impaled upon the hook 11 above the eye 12 of the hook 13 and as being engaged adjacent its other end by the terminal of the hook 13, as at 34, so that its free end 35 will extend beyond the hook, and when trailed, will "wiggle" to attract or lure the fish. By this arrangement, the bacon rind strip may be readily attached, and when so attached will be held properly upon the hook 11 by the closure of the plate 15 upon the same support to which the hook 13 is attached.

When it is desired to use a spinner, a spinner carrying cap or sleeve 20, which is made of thin metal, is applied over the reduced end 7 of the member 6. This cap or sleeve has an aperture 21 in its forward end to align with the aperture 8 of the member 6 and through which apertures a snap hook 19 or the terminal of the fish line 11' may be inserted to hold the parts in the position, as clearly illustrated in Figures 1 and 2.

The cap or sleeve 20 has an eye 22 projecting from its upper face adjacent its rear end for attachment of a spinner thereto. The spinner itself may be of any desired form, but I have shown a form of spinner which is specially adapted for use with my lure and which will now be described.

A wire 23 is bent substantially midway between its ends to form a loop which extends through the eye 22 and then into two substantially parallel portions which extend forwardly of said loop to a point substantially midway of the length of the cap or sleeve. The forward parts of the parallel portions of the wire 23 are secured in any suitable manner to the cap or sleeve 20, as by a loop 24 struck upwardly from the cap or sleeve and overlying said parallel portions, as shown in Figures 1 and 2. The two portions of the wire 23 are then bent upwardly from the cap or sleeve and then divergently as at 25, and each of said portions is provided with a pair of spaced limiting abutments 26 and 26'. A spinner 27 is mounted to rotate on each of the two portions of the wire 23 between the abutments 26 and 26' thereof. Each spinner 27 is made from a single blank to provide a small arrow-shaped portion 28 and a larger arrow-shaped portion 29 of which the terminals 30 and 31, respectively, are oppositely bent to act as a propelling means by which the complete spinner may be caused to rotate upon one of the branches 25 of the wire 23 which extends through eyes in ears 32 bent upwardly from the flank of which the spinner is formed.

As shown in Figure 6, the shank 10 of the hook or securing member 11 extends through an opening 10' of the main carrying member 6 and has its end upset in a depression in the under side of said member so as not to project below into weed-engaging relation. By this construction, the hook is permitted a slight swinging movement relative to the sides of the cavity 9 to prevent the accidental withdrawal of the hook during the capturing of the fish.

From the foregoing description, it is evident that a fish lure constructed according to and embodying the present invention may be used merely with the hook 13, with the fly or bacon rind attachment in combination with the hook 13, or with the spinner-carrying member 20, thus providing a universal lure for the sportman's kit and one in which the enticing or fly member may be changed at will and without the use of a screw-driver or other tool as is usually necessary to change fly members in other types of lures.

I claim :—

1. A fish lure comprising a plate having means at its forward end for connection with a line and having in its upper face a depression extending from a point between its ends through its rear end, a hook extending upwardly from the bottom of said depression, said hook having a portion projecting above the upper face of said plate and its free end directed toward the rear end of said plate, and a cover carried by said plate and movable over and away from said depression, said cover having an opening adapted, when said cover is over said depression, to receive the projecting portion of said hook.

2. A fish lure comprising a plate having means at its forward end for connection with a line and having in its upper face a depression extending from a point between its ends through its rear end, a hook extending upwardly from the bottom of said depression for engagement with the eye of a fish hook, the curved portion of said hook extending above the upper face of said plate and the free end of said hook being below the upper face of said plate and extending toward the forward end of the latter, and a cover carried by said plate and movable into and out of position over said depression, said cover having an aperture to receive the curved portion of said hook when said cover is in closed position, the depression in said plate being wider than the diameter of the shank of said hook to permit a fish hook mounted on said hook to swing transversely of said depression.

3. A fish lure comprising a plate having adjacent its rear end means to engage the eye of a fish hook and of which the forward end is narrower than its rear end, a cap shaped to fit upon the forward end of said plate, said cap and the forward end of said plate having aligning means for engagement by a fishing line, a plurality of spinner-supporting members extending from said cap toward the rear end of said plate in divergent relation to one another, and a spinner rotatably mounted on each of said spinner-supporting members.

4. A fish lure comprising a socket to receive the rear end of a fish-hook carrying member and having an opening to align with an opening in the latter member and receive a fishing line, a spinner-supporting member carried by said socket and extending beyond the rear end of the latter, and a spinner rotatably mounted on said supporting member, said spinner comprising a plate cut to form a pair of portions of substantially arrow-head shape with the points of said arrow head shaped portions extending in the same direction and having the wings of each of said arrow-head shaped portions bent in opposite directions.

5. A fish lure comprising a plate having at its rear end means for connection with a line and having in its upper face a depression extending from a point between its ends through its forward end, and means projecting upwardly from the bottom of said depression for engagement with the eye of a fish hook, said depression being of a depth sufficient to receive the shank of a fish-hook and being from said fish-hook eye-engaging means to the forward end of said plate of a width greater than its depth.

In testimony whereof I have hereunto set my hand.

EDWARD L. FARLEY.